United States Patent [19]

Ritter

[11] Patent Number: 4,654,107
[45] Date of Patent: Mar. 31, 1987

[54] HOSE COOLING CHAMBER WITH COLD GAS RECYCLE

[75] Inventor: Richard D. Ritter, Bath, Pa.
[73] Assignee: Air Products and Chemicals, Inc., Allentown, Pa.
[21] Appl. No.: 771,440
[22] Filed: Aug. 30, 1985

Related U.S. Application Data

[63] Continuation-in-part of Ser. No. 467,116, Feb. 16, 1983, abandoned.

[51] Int. Cl.$^4$ ............................................. B32B 31/04
[52] U.S. Cl. ............................... 156/359; 156/80; 156/149; 156/498; 138/148; 62/63; 62/64
[58] Field of Search ................ 156/80, 149, 498, 359; 264/28; 62/63, 64, 1, 45; 138/148

[56] References Cited

U.S. PATENT DOCUMENTS

| | | |
|---|---|---|
| 598,550 | 2/1898 | Work . |
| 2,974,497 | 3/1961 | Carpenter et al. .................. 62/63 |
| 3,871,185 | 3/1975 | Harper et al. ...................... 62/63 |
| 3,953,270 | 4/1976 | Ford .................................. 156/80 |
| 4,019,939 | 4/1977 | Barbier et al. ..................... 156/80 |
| 4,414,819 | 11/1983 | Contal et al. ...................... 62/222 |

Primary Examiner—Caleb Weston
Attorney, Agent, or Firm—Mark L. Rodgers; E. Eugene Innis; James C. Simmons

[57] ABSTRACT

The present invention relates to an improved cooling chamber for the manufacture of high-pressure reinforced hose. Hose to be treated is passed through a tubular passageway in the cooling chamber where it is contacted with a cryogenic fluid. A portion of the cryogenic fluid is passively recycled via a recycle loop to provide further cooling within the tubular passageway. An end seal is attached to one end of the cooling chamber to prevent moisture build-up and freezing inside the chamber.

7 Claims, 2 Drawing Figures

HOSE COOLING CHAMBER WITH COLD GAS RECYCLE

CROSS REFERENCE TO PATENT APPLICATION

This is a continuation-in-part of U.S. patent application Ser. No. 467,116, filed Feb. 16, 1983, abandoned, the subject matter of which is hereby incorporated by reference.

TECHNICAL FIELD

The present invention relates to a cooling chamber for cryogenically cooling hose. More particularly, it is concerned with the cooling chamber employed in a hose cooling/braiding operation in the manufacture of reinforced hose.

BACKGROUND OF THE INVENTION

In the manufacture of braid reinforced hose it is important that the soft inner liner of the hose is stiffened prior to the braiding step. If the inner liner is not stiffened, several undesirable conditions may result. For example, the braid may sink down and imbed itself into the hose and/or the liner may bulge behind the braiding point. Both of these conditions decrease product quality and increase scrap hose generation.

One method disclosed in the art to achieve this necessary stiffening is hose cooling. Hose cooling can be defined as a method of artificially hardening the inner liner portion of a reinforced hose prior to applying the braiding.

U.S. Pat. No. 598,550, discloses subjecting rubber to low temperatures, preferably below 0° F., until it becomes sufficiently rigid and of greatly-impaired elasticity so that it can be handled without the necessity of employing mandrels, formers, or other mechanical supports. While the rubber is in this rigid condition, it is covered with various forms of fabric and additional layers of rubber or other material which may be desired to be applied for a covering. The rubber is cooled by simply subjecting it to any desired or appropriate treatment by which the inner tube becomes, for a temporary period, sufficiently rigid to undergo subsequent treatment.

U.S. Pat. No. 4,019,939, discloses a process for forming a mandrel from congealable fluid which is introduced in liquid form into the hose which is to be treated in a braid reinforcement operation. The hose or tube is filled with fluid and brought in contact with an environment kept at very low temperatures. The fluid is transformed rapidly into a solid bar, causing the material of the tube itself to become rigid. The fluid remains solidified during operations in which the hose must resist mechanical stresses which otherwise would not be endured by its own elements. The solidified liquid is subsequently brought back to liquid form and removed from the hose. The temperature to which the hose must be cooled is a function of the congealable fluid used.

Ford, U.S. Pat. No. 3,953,270, discloses a method of manufacturing flexible high-pressure, textile reinforced, elastomeric hose. The process comprises extruding the inner elastomeric layer on to a flexible mandrel coextensively therewith and subsequently passing the inner layer progressively through a freeze chamber operative to freeze the layer. When the layer emerges from the freeze chamber it is frozen solid and is immediately passed through a braider which applies a braided textile layer. The freeze chamber is a tubular heat exchanger which is maintained at a temperature of about −60° F. The freezing temperatures are preferably maintained by liquid nitrogen surrounding the freezer tube.

Harper, et al., U.S. Pat. No. 3,871,185 discloses a method and apparatus for flash freezing various articles. The articles to be frozen are transported into, through and out of an elongated freezing chamber. Liquid nitrogen is sprayed onto the articles at one region of the Chamber. Pumping means are provided together with a suction inlet and discharge outlet in the chamber to recirculate the gas at a high velocity. A liquid nitrogen recirculation system is also provided to recirculate the liquid which did not flash to a gas back to the spray headers.

Contal, et al., U.S. Pat. No. 4,414,819, discloses an apparatus for temporarily rendering rigid a product of soft material of elongated form such as rubber tube. The rubber tube is cooled in a tunnel by liquid nitrogen vaporized in an exchanger. A part of the nitrogen travels in counter-flow and another predetermined part travels in equidirectional flow of the tube towards a process station.

BRIEF SUMMARY OF THE INVENTION

The present invention is an improved cooling chamber for use during the manufacture of high pressure reinforced hose. The chamber is used to cool a section of hose to a point where the hose becomes sufficiently rigid to undergo subsequent treatment steps without becoming frozen or embrittled.

The cooling chamber comprises a tubular passageway extending axially through the chamber and having a hose inlet and hose outlet for permitting passage of the hose. A sealing means is connected to one end of the tubular passageway to prevent the passage of vapor into or out of that end of the passageway when the hose section is in the passageway. A fluid inlet is in fluid communication with the passageway by which a cryogenic fluid can be introduced into the passageway and against the surface of the hose section. A fluid outlet, also in fluid communication with the tubular passageway, is positioned such that the fluid inlet is located intermediate the sealing means and the fluid outlet.

A recycle loop in fluid communication with the tubular passageway is positioned such that its entrance end is at a point between the fluid inlet and fluid outlet, and its exit end is at a point between the sealing means and the fluid inlet.

This cooling chamber design provides for directional flow of cryogenic fluid along the surface of the hose. The combination of directional flow and the sealing means results in a venturi effect or negative pressure behind the fluid inlet which allows vaporized cryogenic fluid to be passively recycled.

A temperature sensing device can optionally be positioned adjacent to the cryogenic fluid outlet to monitor the temperature of the fluid leaving the tubular passageway. By monitoring the temperature of the exiting vapor, the rate of cryogenic fluid being introduced into the tubular passageway can be regulated to insure that the hose section is cooled to the desired temperature; i.e., between −30° to 35° F., and also that all of the cryogenic fluid flashes to a vapor within the tubular passageway.

DETAIL DESCRIPTION OF THE INVENTION

The present invention is a cooling chamber for use in an in-line continuous process for cooling hose during a hose cooling/braiding operation. This cooling chamber can be used on any type of hose which must be stiffened prior to undergoing subsequent treatment. It is especially useful in the manufacture of elastomeric, high-pressure rubber hoses, although it can also be used for any other type of hose such as plastic. The hose is cooled in the cooling chamber to a temperature between −30° F. to 35° F. At this temperature range the hose becomes rigid enough to withstand the stress applied during subsequent braiding operations, yet does not freeze and become embrittled as it does at temperatures below about −30° F. In fact, if wire reinforcing braiding is being applied instead of textile braiding, it is especially important that the hose is not cooled to a point of freezing since the wire braiding will rust upon thawing.

The cooling agent used in the claimed invention can be any suitable cryogenic fluid which can be injected into the cooling chamber to cool the hose to a temperature between −30° to 35° F. and which totally flashes to a cold gas in the cooling chamber. Examples of suitable cryogenic fluids include liquid nitrogen, liquid $CO_2$ and liquid argon, with liquid nitrogen being preferred. It should be noted that the term "fluid" includes the above-mentioned substances and all other substances in both liquid and gas phases.

By controlling the injection rate of the cryogenic fluid such that it totally flashes to a cold gas, the present cooling chamber can produce a high Btu transfer resulting in an efficient method of achieving required stiffening temperatures. For example, the low temperature of liquid nitrogen (−320° F./−196° C.) results in rapid cooling response and eliminates costly cool-down time thus providing the ability to place the system in operation only minutes prior to actual production. The high thermal driving force and rapid heat transfer result in an increase in handling speeds and tension and a decrease in rejected hose. The nitrogen is very effective in holding critical tolerance specification for hydraulic and high-pressure hose, and in eliminating hose walk-back on the mandrel. Additionally, the low temperature and high refrigeration value (166 Btu/lb) of liquid nitrogen allows the totally vaporized fluid to be recycled and used in the cooling process.

Figure 1:
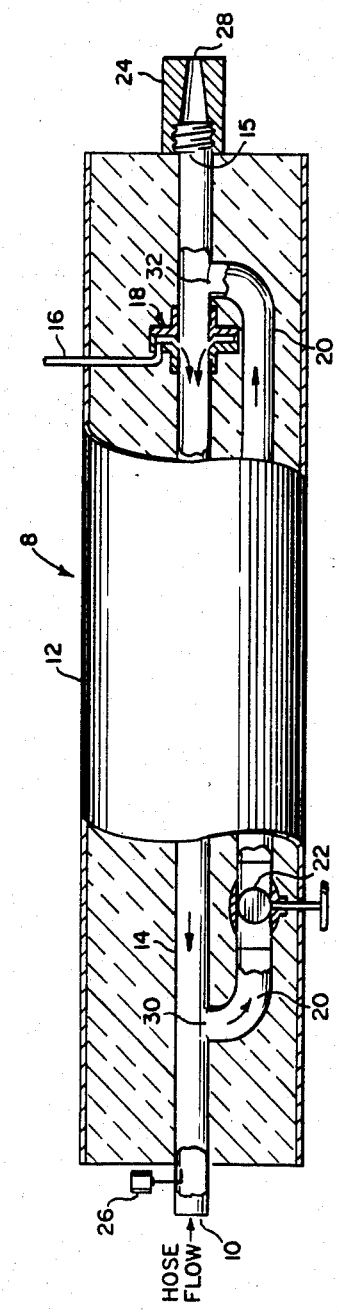
FIG. 1 is a front view, partially sectioned, of a hose cooling chamber in accordance with one embodiment of the present invention.

One particular embodiment of the present process can be described by referring to FIG. 1. A hose cooling chamber, shown generally as 8, contains a tubular passageway 14 running axially through an insulated housing 12. The tubular passageway 14 can be made of any material which can withstand long periods of exposure to cryogenic fluids, and is preferably made of a metal such as copper or stainless steel. The length and diameter of the tubular passageway 14 can vary depending upon the size of the hose used and the desired cooling temperature. A previously extruded hose (not shown) enters the tubular passageway 14 through a hose inlet 10, travels through the tubular passageway, and exits through a hose outlet 15. The hose outlet 15 of the tubular passageway 14 is sealed by a tapered end seal 24 which is attached to the tubular passageway 14 by a securing means, such as pipe thread. This end seal 24 tapers to form a restrictive mouth 28 which is adjusted to be approximately the same diameter as the hose being cooled, so that vapor is prevented from entering or leaving this end of the tubular passageway 14 when the system is in operation. The end seal 24 can be made of any temperature insensitive material, for example, brass, engineering plastics or polytetrafluoroethylene, which can be purchased under the trademark Teflon.

A cryogenic fluid is injected into the tubular passageway 14 and against the surface of the hose by a cryogenic injection line 16 in combination with a cryogenic fluid inlet or spray nozzle 18. The cryogenic fluid is injected into the passageway 14 in a direction opposite the end seal 24, and is withdrawn from the tubular passageway 14 via a cryogenic fluid outlet, which in the present embodiment is also the hose inlet 10. The cryogenic fluid outlet 10 is positioned such that the cryogenic fluid inlet or spray nozzle 18 is positioned intermediate the end seal 24 and the cryogenic fluid outlet 10. This allows for directional flow of the cryogenic fluid parallel to the longitudinal direction of the passageway between the cryogenic fluid inlet 18 and the cryogenic fluid outlet 10. The cryogenic fluid inlet or spray nozzle 18 is located at a point along the tubular passageway 14 so as to allow for sufficient contact time between the hose and the cryogenic fluid for satisfactory cooling to take place.

As the hose passes through the tubular passageway 14, it is cooled by the rapid flow of cryogenic fluid along the hose surface. During this cooling process, the cryogenic fluid totally flashes to a cold gas within the tubular passageway 14. At least a portion of the cold gas is subsequently withdrawn from the tubular passageway 14 into a recycle loop entrance 30 located between the fluid inlet 18 and the fluid outlet 10. This portion of the cold gas is passively recycled to the tubular passageway 14 at a point between the end seal 24 and the fluid inlet or spray nozzle 18 via a recycle loop 20. The cold gas is passively recycled due to a negative pressure within the recycle loop 20 caused by the Venturi effect at the recycle loop exit 32 resulting from the directional flow of cryogenic fluid in front of this point. The Venturi effect would normally cause warm air to enter the tubular passageway 14 through the hose outlet 15, however the use of the end seal 24 with the tapered mouth 28 prevents this, and, instead, causes the vaporized cryogenic fluid to be drawn through the recycle loop 20.

The temperature of the vaporized cryogenic fluid exiting through the cryogenic fluid outlet 10 is monitored by a temperature sensor 26 positioned adjacent to the cryogenic fluid outlet 10. The temperature sensor 26 can be any type of device commonly known in the art for sensing and recording the temperature of a gas stream. The temperature of the cryogenic fluid leaving the cryogenic fluid outlet 10 is monitored to determine the amount of cryogenic fluid which must be injected into the tubular passageway 14 via the fluid inlet or spray nozzle 18, to cool the hose to between −30° to 35° F., while still insuring that all of the cryogenic fluid is vaporized prior to reaching the passive withdrawal point 30 within the tubular passageway 14. The temperature range of the exiting cryogenic fluid at which these conditions will be met will vary with different operating conditions and hose types and should be determined prior to starting production.

Additionally, the cryogenic fluid is recycled through recycle loop 20 until the temperature sensor 26 indicates that the exiting gas is too warm to cool the hose to the desired temperature. When the temperature of the cryogenic fluid exiting the tubular passageway 14 via the fluid outlet 10 becomes too high, the flow of recycled fluid through recycle loop 20 is decreased or stopped by adjusting a flow control valve 22 positioned within the recycle loop 20. The fluid control valve 22 is operated to slow down the fluid recycle until enough new cryogenic fluid is introduced into the system to maintain the desired temperature. This recycle process therefore allows for maximum utilization of the cryogenic fluid without allowing the temperature within the chamber 14 to exceed a prescribed limit.

By monitoring the temperature of the cryogenic fluid leaving the tubular passageway 14, the rate of injection of the cryogenic fluid into the tubular passageway 14 can be adjusted so as to achieve maximum utilization of the cryogenic fluid without allowing the temperature within the chamber to exceed a prescribed limit, or for the temperature to fall below a limit such that the hose becomes embrittled or freezes. This also insures that all of the cryogenic fluid injected into the tubular passageway 14 flashes to a cold gas which allows the passive recycle caused by the Venturi effect behind the spray nozzle to take place without the necessity of a liquid reservoir or a pumping system.

The use of this cold gas recycle system combined with the tapered end seal 24 allows for a portion of the vaporized cryogenic fluid to be reused to cool the hose. By using this cold recycle gas instead of outside vapors, less cryogenic fluid is needed, thus increasing the efficiency of the system. Recycling the cold gas also results in a cooler atmosphere behind the injection nozzle 18 which prevents unwanted frost build-up inside the chamber, thereby providing an essentially moisture-free system.

Figure 2:
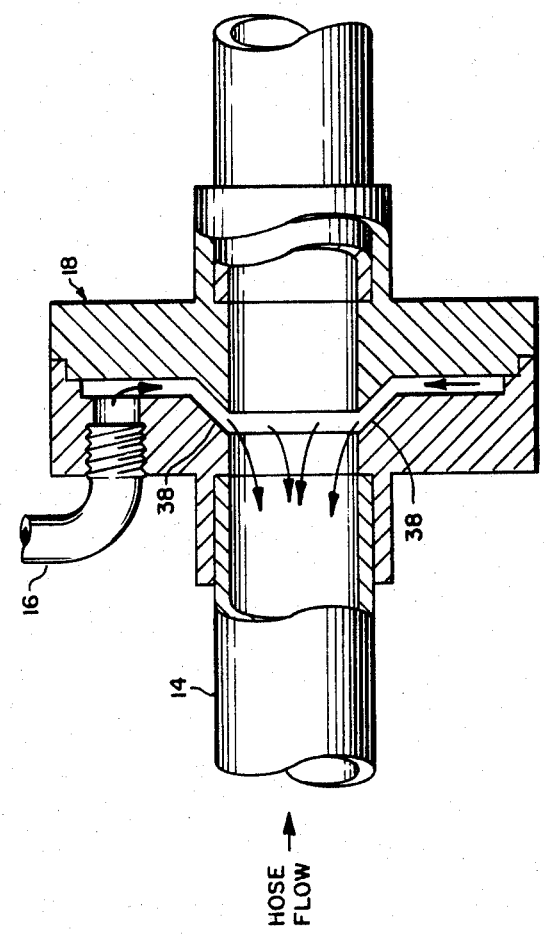
FIG. 2 is an enlarged front view, partially sectioned, of the cryogenic fluid spray nozzle and related conduits.

FIG. 2 is an enlarged representation of the injection line 16 and spray nozzle 18 combination. The outlet conduit 38 of the spray nozzle 18 is angled to cause the cryogenic fluid to flow in a direction toward the cryogenic fluid outlet. It is this directional flow, combined with the tapered end seal behind the spray nozzle 18 which causes the Venturi effect behind said nozzle 18 which allows for the passive recycle of cold gas through a recycle loop to a point behind the spray nozzle 18.

The design of the present system allows for the maximum utilization of the cryogenic fluid along with a passive recycle system which results in a much simpler cooling chamber design than in prior system such as Harper, et al. Additionally, the use of a temperature sensor to monitor the fluid leaving the cooling chamber so as to adjust the amount of cryogenic fluid injected into the tubular passageway, allows the hose to be cooled to a temperature sufficient to make the rubber rigid, yet not freeze the rubber which, as mentioned above, can have detrimental effects when using subsequent braiding operations.

Having thus described the present invention, what is now deemed appropriate for Letters Patent is set out in the following appended claims.

What is claimed is:

1. A chamber for cooling a section of hose to a point where said hose section becomes sufficiently rigid to undergo subsequent treatment steps without becoming frozen or embrittled, said chamber comprising:
    (a) a tubular passageway extending axially through the chamber, said tubular passageway having a hose inlet and a hose outlet for permitting passage of the hose;
    (b) a means for sealing one end of the tubular passageway to prevent the passage of vapor into or out of that end of the passageway when the hose section is in the passageway;
    (c) a fluid inlet in fluid communication with the tubular passageway for introducing a cryogenic fluid into said passageway and against the surface of the hose section;
    (d) a fluid outlet in fluid communication with the tubular passageway positioned such that the fluid inlet is located intermediate the sealing means and the fluid outlet; and
    (e) a recycle loop having an entrance end in fluid communication with the tubular passageway at a point between the fluid inlet and fluid outlet and an exit end in fluid communication with the tubular passageway at a point between the sealing means and the fluid inlet.

2. The chamber in accordance with claim 1 wherein a braiding device is located adjacent to the hose outlet.

3. The chamber in accordance with claim 1 wherein the hose inlet of the tubular passageway is also the fluid outlet.

4. The chamber in accordance with claim 1 wherein the sealing means is a tapered end seal having a restrictive mouth.

5. The chamber in accordance with claim 4 wherein the fluid inlet comprises an injection line and a spray nozzle.

6. The chamber in accordance with claim 5 wherein a flow control valve is positioned along the recycle loop to regulate the flow of recycle gas.

7. The chamber in accordance with claim 1 wherein a temperature sensing device is located adjacent to the fluid outlet to monitor the temperature of the gas leaving the tubular passageway.

* * * * *